(12) United States Patent
Zarrabi

(10) Patent No.: US 12,479,307 B2
(45) Date of Patent: Nov. 25, 2025

(54) ENERGY RECOVERY SYSTEM

(71) Applicant: Carrier Corporation, Palm Beach Gardens, FL (US)

(72) Inventor: Jamal Zarrabi, Franqueville Saint Pierre (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 120 days.

(21) Appl. No.: 18/325,157

(22) Filed: May 30, 2023

(65) Prior Publication Data
US 2023/0382233 A1 Nov. 30, 2023

(51) Int. Cl.
*B60L 7/18* (2006.01)

(52) U.S. Cl.
CPC ............ *B60L 7/18* (2013.01); *B60L 2240/14* (2013.01); *B60L 2240/642* (2013.01)

(58) Field of Classification Search
CPC .. B60L 7/18; B60L 2240/14; B60L 2240/642; B60L 58/15; B60L 7/00; B60L 7/10; B60K 25/08; B60H 1/32; B60P 3/20
See application file for complete search history.

(56) References Cited

U.S. PATENT DOCUMENTS

| | | | | |
|---|---|---|---|---|
| 6,033,041 | A * | 3/2000 | Koga | B60L 7/18 303/192 |
| 9,902,272 | B2 | 2/2018 | Sawada et al. | |
| 10,245,972 | B2 | 4/2019 | Healy et al. | |
| 2011/0276216 | A1 | 11/2011 | Vaughan | |
| 2021/0387545 | A1* | 12/2021 | Lee | B60L 15/20 |
| 2023/0134693 | A1* | 5/2023 | Kim | B60K 6/442 701/22 |
| 2023/0382233 | A1* | 11/2023 | Zarrabi | B60L 7/18 |
| 2024/0013591 | A1* | 1/2024 | Minaz | G07C 5/0808 |

FOREIGN PATENT DOCUMENTS

KR 20170006064 A * 1/2017

OTHER PUBLICATIONS

Extended European Search Report received for EP Application No. 22176521.7, mailed on Nov. 18, 2022, 07 Pages.

\* cited by examiner

*Primary Examiner* — Peter D Nolan
*Assistant Examiner* — Demetra R Smith-Stewart
(74) *Attorney, Agent, or Firm* — Drew Folgmann

(57) ABSTRACT

A method and system used for controlling energy recovery from a vehicle, wherein the vehicle comprises a generator for recovering energy from rotation of the axle during operation of the vehicle. The method comprises measuring the inclination of the vehicle, and preventing the generator from recovering energy if the inclination of the vehicle is greater than zero.

19 Claims, 2 Drawing Sheets

ENERGY RECOVERY SYSTEM

CROSS REFERENCE TO RELATED APPLICATIONS

This application claims priority to European Patent Application No. 22176521.7 filed on May 31, 2022.

BACKGROUND

The present invention relates to a method and system for controlling the energy recovery from a vehicle. In particular, the vehicle may be a transport refrigeration unit (TRU), wherein the energy recovery is used to supply power to the refrigeration unit or recharge a battery for powering the refrigeration unit.

During normal operation of a vehicle, the rotational force to drive the wheels is typical provided by an internal combustion engine or by an electric motor which is powered by a battery. In the case of the drive being provided by an internal combustion engine, a battery may still be present within the vehicle in order to power one or more auxiliary systems on board the vehicle. Batteries used in vehicle are usually rechargeable batteries and hence there is a need to recharge them over time.

Once such method for recharging on-board batteries is by recovering energy from the rotational movement of the axle. In particular, the axle can be coupled to a generator which is then used to recharge the battery as the generator rotates.

This is of particular use in transport refrigeration units (TRU) for transporting perishable goods between locations. TRUs may be used to transport the perishable goods from a central depot to one or more regional locations to then be sold to the consumer.

The storage unit of the TRU requires a refrigeration unit in order to maintain the desired temperature required to keep the perishable goods in a desired state. The refrigeration unit requires a power supply in order to operate and typically a rechargeable battery is used as the power supply.

In many cases, the battery is recharged by a power supply, e.g. grid connection, at a depot, however certain systems utilise the energy recovery system described above to, at least partly, charge the battery used to power the refrigeration system.

The energy recovery system typically runs constantly so that there is a permanent load on the generator. This may lead to a decrease in the efficiency of the engine driving the vehicle and may therefore lead to higher fuel consumption. It may also result in an increased torsional load on the axle and so it may reduce the lifetime of the components within the system. There is therefore a desire to improve the energy recovery system in order to overcome these drawbacks.

BRIEF SUMMARY

Viewed from a first aspect, there is provided a method of controlling energy recovery from a vehicle, wherein the vehicle comprises a generator for recovering energy during operation of the vehicle, the method comprising; measuring the inclination of the vehicle and preventing the generator from recovering energy if the inclination of the vehicle is greater than zero.

The method may comprise measuring the acceleration of the vehicle.

The energy may be recovered from the rotation of the axle of the vehicle, wherein the axle may be configured to rotate the generator.

BRIEF DESCRIPTION OF THE DRAWINGS

Certain preferred embodiments of the present invention will now be described, by way of example only, with reference to the following drawings, in which.

DETAILED DESCRIPTION

Figure 1:
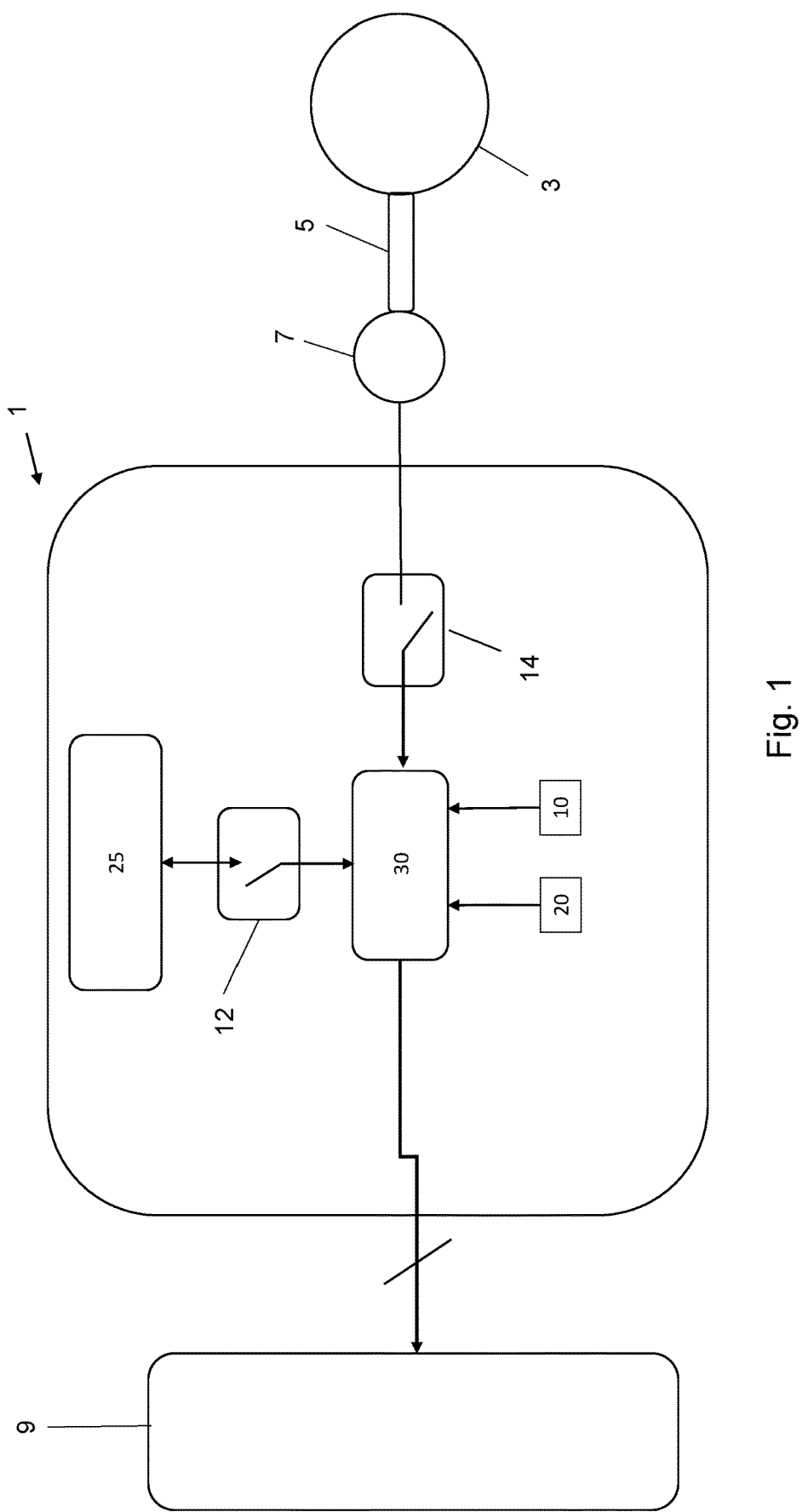
FIG. 1 shows a system for controlling the energy recovery from a vehicle.

The method described herein allows the system to determine the inclination of the vehicle and therefore may allow the identification of when the rotational energy is "free". In previous systems where energy recovery occurred continuously, the energy recovery system was not able to determine whether the acceleration or deceleration of the vehicle was due to the driver request, i.e. pressing the brake or accelerator pedal in the vehicle, or if the acceleration or deceleration was the result of the vehicle moving up or down an incline.

The term "free energy" in this case may be interpreted as rotational energy which is not the result of an increase in rotational drive provided by either the internal combustion engine or battery powering the vehicle. In particular, if the vehicle was moving down an incline the force of gravity would increase the speed of the vehicle if no other forces were acting on it. Hence the acceleration of the vehicle would not be due to the drive system of the engine and is therefore considered "free".

In certain cases, the vehicle may be decelerating due to travelling up an incline in the road. In this case the vehicle may require additional rotational energy in order to climb the slope, e.g. at a constant or not significantly reduced speed. However, in conventional systems even when a vehicle is going up a slope, rotational energy is still being transferred to the generator to charge the battery. Similarly, the vehicle may be accelerating up an incline due to the driver pressing on the accelerator pedal, but excessive rotational energy may still be transferred to the generator to charge the battery. Both of these instances may significantly reduce the overall system efficiency as the engine rotating the axle is having to work harder to both drive the vehicle and rotate the generator.

By measuring the inclination of the vehicle, the method may be able to determine when the energy recovered from the rotational energy of the axle is free. For instance, if the inclination is less than zero, the vehicle is moving down an incline in the road. Therefore, if the inclination is less than zero and the acceleration is greater than zero, the method may comprise determining that the acceleration may be due to the vehicle freewheeling. Therefore, the added rotational energy in the axle is therefore provided by effect of gravity on the vehicle, not from the engine. The generator may therefore recover this extra "free" energy. Further, if the vehicle is decelerating whilst moving down an incline, the method may determine that the deceleration is due to a driver request, i.e. the driver pressing the brake pedal.

In contrast, if the inclination is greater than zero, as in the first aspect above, the method may determine that the vehicle is moving up an incline and it therefore requires substantially all of the rotational energy to be used to drive the vehicle. In particular, if the vehicle is decelerating whilst travelling up an incline, the method may determine that this is due to the increase in gradient. Similarly, if the vehicle is accelerating whilst travelling up an incline, the method may determine that this due to a driver request, i.e. the driver pressing the accelerator pedal. In both of these cases, the rotational energy is not "free" and is required to drive the vehicle.

The method may mean that energy recovery is only performed at certain times during operation of the vehicle, e.g. when the energy is free. This may allow the lifetime of the components to increase.

This method may allow the load on the vehicle to be reduced as the vehicle is going up a slope. This may result in less energy being needed to get the vehicle up the slope. This may reduce the fuel consumption of the vehicle.

The method may comprise preventing the generator recovering energy if the inclination is greater than zero and the acceleration is greater than zero.

The method may also comprise preventing the generator recovering energy if the inclination is greater than zero and the acceleration is less than zero.

While the above aspect may be primarily focused on preventing the recovery of energy in certain instances, it will be appreciated that in other conditions the method may also allow energy recovery to take place via the generator.

For example, the method may allow the generator to recover energy if the inclination is less than zero. Furthermore, the method may allow the generator to recover energy if the inclination is less than zero and the acceleration is greater than zero. Alternatively, or in addition, the method may allow the generator to recover energy if the inclination is less than zero and the acceleration is less than zero.

So far the circumstance where the vehicle is on either an incline or decline has been discussed, however it will be appreciated that the method may also operate when the vehicle is on a flat surface, i.e. when the inclination is at or near zero. The method may comprise monitoring the acceleration or deceleration of vehicle if the inclination is at or near zero, optionally wherein the inclination equals zero. The term "at or near zero" in this instance may be interpreted as wherein the slope of the road is substantially flat such that it does not have a noticeable effect on the acceleration or deceleration of the vehicle under a constant drive force. For example, the inclination of the vehicle may be between −5° and +5° from horizontal.

The method may comprise allowing the generator to recover energy if the inclination is at or near zero and the acceleration is less than zero. In other words, if the vehicle is decelerating on a flat surface, this may be due to a driver request and the method may determine that the rotational energy in the axle is "free" and can therefore be used for energy recovery.

The vehicle may also be decelerating due to other forces acting on the vehicle such as the friction present in the system, e.g. the friction between the bearings and axle and/or wheel. Thus any deceleration (e.g. on a flat surface) may not, especially when small, be due to, at least in part, a driver request and so the rotational energy may not comprise "free" energy.

The method may comprise allowing the generator to recover energy only once the acceleration is less than zero by more than a predetermined threshold. For example, if the inclination is at or near zero, the predetermined threshold may be equivalent to the deceleration of the vehicle due to other forces aside from the driver request, such as the friction within the system. For example, if the inclination is at or near zero the predetermined threshold may be between 0 and 2 m/s2.

Meanwhile, the method may comprise preventing the generator recovering energy if the inclination is at or near zero and the acceleration is greater than zero. In other words, if the vehicle is accelerating on a flat surface, the acceleration may be due to a driver request and the method may determine that the rotational energy is required to drive the vehicle at a higher speed, and therefore may not be used by the generator.

Alternatively, the method may comprise allowing the generator to recover energy if the inclination is at or near zero and the acceleration is less than zero. For example, the method may comprise allowing the generator to recover energy when the vehicle is on a flat surface, regardless of the acceleration or deceleration of the vehicle.

The steps of measuring the inclination and/or acceleration of the vehicle may be continuous and/or at set, frequent intervals. The step of preventing energy recovery may comprise stopping energy recovery where energy recovery was previously occurring. Additionally, the step of preventing energy recovery may comprise continuing to prevent energy recovery where energy recovery had already been stopped. Similarly, the step of allowing energy recovery may comprise allowing energy recovery where energy recover was previously taking place, i.e. continuing to allow energy recovery. Additionally, the step of allowing energy recovery may comprise allowing energy recovery where previously energy recovery was prevented, i.e. starting energy recovery.

The method may therefore be used to determine the modes of operation of the vehicle which result in free energy recovery. A first mode of operation may be where the vehicle is in (at least partly) freewheel acceleration due to a decline in the slope (i.e. inclination less than zero). This first mode of operation may be indicated by the acceleration being greater than zero and the inclination being less than zero.

A second mode of operation may be where the vehicle is decelerating due to a driver request, i.e. when the driver presses the brake pedal of the vehicle, when the vehicle is either on a declining surface or a flat surface. This second mode of operation may be indicated by the acceleration being less than zero and the inclination being less than zero or at or near zero.

The method may comprise determining the expected acceleration depending on the measured inclination of the vehicle. In particular, for a given inclination the method may determine whether the vehicle is expected to accelerate or decelerate, and at what rate. The method may comprise comparing the expected acceleration for the measured inclination to the measured acceleration.

If the measured acceleration is greater than the expected acceleration (e.g. on a decline), the method may comprise determining that the acceleration of the vehicle is partly due to driver request, i.e. the driver pressing the brake pedal, and partly due to freewheel acceleration. This may occur in the first mode of operation above. In this case energy recovery may be allowed.

If the measured acceleration (deceleration in this instance) is lower (i.e. more negative) than the expected acceleration (e.g. on an upwards slope), then the method may comprise determining that the deceleration is at least partly due to driver request, i.e. the driver pressing the brake pedal. This may occur in the second mode of operation above. In this case energy recovery may be allowed.

The method may be able to further identify a third and/or fourth mode of operation where it prevents energy recovery. The third mode of operation may be where the deceleration of the vehicle is due to an inclined slope, i.e. the slope is slowing the vehicle down. A fourth mode of operation may therefore be where the vehicle is accelerating whilst travelling up an inclined slope, and therefore the method may identify that said acceleration is not the result of freewheel acceleration down a slope and is therefore not free energy for the vehicle to recover.

By identifying these two modes of operation, the method allows the generator to only recover energy when it is free, and/or prevent energy recovery when the rotational energy is required to drive the vehicle, i.e. when it is not free. The method may therefore reduce the load on the generator in modes of operation where significant rotational power is required by the axle. As there is reduced load on the generator, the operation of the vehicle may be more efficient as the rotational power provided by the drive system is only required to drive the axle/wheels, without also having the drive the generator to recover energy. This may have the effect of significantly improving the operation of the vehicle and reducing fuel consumption. Moreover, given that there is less load on the axle during periods where the method may prevent energy recovery, there is also less load on the axle and wheels which may therefore increase the lifetime of the axle and wheels. This may also lead to reduced fuel consumption of the vehicle.

The vehicle may comprise a rechargeable battery. The rechargeable battery may be coupled to the generator. The generator may be configured to generate electrical power that may be used to recharge the rechargeable battery.

The rechargeable battery and/or generator may be used to power auxiliary units of the vehicle. This may for example be the lights, air conditioning, entertainment system, etc.

The vehicle may be a refrigerated transport unit which may comprise a drive vehicle and a refrigeration unit. In this case the refrigeration unit may be regarded as an auxiliary unit of the vehicle.

The rechargeable battery and/or generator may be used to power the refrigeration unit of the transport refrigeration unit.

Alternatively, the vehicle may be car. The car may be an electric car wherein the drive is provided by the rechargeable battery. Alternatively, the car may be a hybrid vehicle, wherein it may further comprise an internal combustion engine for driving the vehicle. The rechargeable battery may be used to start the internal combustion engine.

The method may comprise charging the rechargeable battery using the recovered energy.

An issue with earlier systems for recharging the battery of the refrigeration unit is that the drive system of the vehicle had no interaction with the refrigeration unit, in particular the battery of the refrigeration unit. As discussed above, the drive system comprising the generator would therefore recharge the battery continuously, even when the energy was not "free". The method according to the first aspect above may therefore overcome this drawback by measuring the inclination in order to prevent energy recovery when the energy is not "free".

The vehicle may comprise a processor to control the power supply, such as power supply to the auxiliary unit(s) such as a refrigeration unit. The processor may be configured to provide power to one or more auxiliary units from the rechargeable battery. Alternatively, the processor may be configured to provide power to the auxiliary unit(s) directly from the generator via the energy recovery system.

The method may comprise determining the charge level of the rechargeable battery. The method may comprise charging the rechargeable battery to a charge level 90% or greater, such as a level of between 90% and 100%, optionally between 90% and 95%, or optionally between 95% and 100%, further optionally to 95% or greater.

The method may comprise powering the auxiliary unit(s) directly from the generator if the charge level of the battery is over 90%, such as over 95%. In this instance, the system, e.g. processor, may be configured to decouple the rechargeable battery from the providing power to the auxiliary unit(s) until the generator is no longer able to provide sufficient power. Alternatively, the rechargeable battery and the generator may both provide power directly to the auxiliary unit(s) directly in parallel. In this instance, the discharge rate of the rechargeable battery may be reduced as the power to the auxiliary unit(s) is supplemented by the generator.

If the charge level of the battery (i.e. state of charge) is below a point where it is no longer able to meet the electrical demands of the auxiliary unit(s), the processor may be configured to allow energy recovery regardless of the measured inclination or acceleration. For instance, if the battery no longer holds sufficient charge to power the auxiliary unit(s) at all, or for a given future period of time, then the system, e.g. processor, may be configured to allow the generator to recover energy. This ensures that the auxiliary unit(s) can continue to operate as normal. However, it does mean that the energy recovery may occur when the rotational energy is not "free".

The charge level of the battery (state of charge) at which it is no longer able to meet the electrical demands of the battery may be less than 30%, optionally less than 20%, optionally 10%, optionally less than 5%, optionally less than 2%.

The step of preventing the generator from recovering energy may comprise decoupling the axle from the generator such that the rotation of the axle is not transmitted to the generator and the generator may therefore no longer rotate. This may reduce the load on the axle.

Viewed from a second aspect, there is provided a system for controlling energy recovery from a generator of a vehicle, wherein the system comprises; an inclinometer for measuring the inclination of the vehicle; and a processor configured to: determine the inclination of the vehicle using the measured inclination; and prevent the generator from recovering energy if the inclination of the vehicle is greater than zero.

The system described in the present second aspect may comprise any of the features discussed in relation to the first aspect above. In other words, the system may be suitable for and/or arranged to perform one or more or all steps of the above described method, including the optional features. For example, the processor of the second aspect may be configured to carry out the steps of the method as discussed in the first aspect, and the vehicle of the second aspect may comprise any of the features discussed in the first aspect. The most notable features, however, will be discussed herein in relation to the second aspect.

The system may comprise an accelerometer for measuring the acceleration of the vehicle. The system, e.g. processor, may therefore be configured to determine the acceleration of the vehicle using the measured acceleration.

The system, e.g. processor, may be configured to prevent the generator recovering energy if the inclination is greater than zero and the acceleration is greater than zero. The system, e.g. processor, may be configured to prevent the generator recovering energy if the inclination is greater than zero and the acceleration is less than zero.

As with the first aspect, the system, e.g. processor, may also be configured to allow the generator to recover energy in certain instances. For example, the system, e.g. processor, may be configured to allow the generator to recover energy if the inclination is less than zero. Furthermore, the system, e.g. processor, may be configured to allow the generator to recover energy if the inclination is less than zero and the acceleration is greater than zero. Alternatively, or in addition, the system, e.g. processor, may be configured to allow the generator to recover energy if the inclination is less than zero and the acceleration is less than zero.

The system may also be used for controlling energy recovery from a generator when the vehicle is on a flat surface. For instance, the system, e.g. processor, may be configured to monitor the acceleration or deceleration of vehicle if the inclination is at or near zero, optionally wherein the inclination equals zero.

The system, e.g. processor, may be configured to allow the generator to recover energy if the inclination is at or near zero and the acceleration is less than zero.

Meanwhile, the system, e.g. processor, may be configured to prevent the generator recovering energy if the inclination is at or near zero and the acceleration is greater than zero.

Alternatively, the system, e.g. processor, may be configured to allow the generator to recover energy if the inclination is at or near zero and the acceleration is less than zero. For example, the system, e.g. processor, may be configured to allow the generator to recover energy when the vehicle is on a flat surface, regardless of the acceleration or deceleration of the vehicle.

The vehicle may comprise a rechargeable battery. The rechargeable battery may be coupled to the generator. The system may be arranged so that the generator can (when needed) provide electrical power to recharge the rechargeable battery.

The vehicle may comprise one or more auxiliary units that may require electrical power.

The vehicle may be a refrigerated transport unit which may comprise a drive vehicle and a refrigeration unit. In this case the refrigeration unit may be regarded as an auxiliary unit.

The rechargeable battery and/or generator may be used to power the auxiliary unit(s), e.g. the refrigeration unit of the transport refrigeration unit.

The system, e.g. processor, may be configured to charge the rechargeable battery using the energy recovered using the generator. Alternatively, or in addition, the system, e.g. processor, may be configured to power the auxiliary unit(s) directly using the energy recovered using the generator.

The battery may form a part of the system for controlling the energy recovery. In particular, one or both of the inclinometer and accelerometer may be configured to provide their respective measurements to the processor. The processor may be configured to make the determination of inclination or acceleration and control the energy recovery accordingly (e.g. by performing one or more or all steps of the method described above). The processor may be configured to operate the battery charging accordingly.

The system, e.g. processor, may be configured to control the power supply to the auxiliary unit(s). The system, e.g. processor, may be configured to provide power to the auxiliary unit(s) from the rechargeable battery. Alternatively, the system, e.g. processor, may be configured to provide power to the auxiliary unit(s) directly from the generator via the energy recovery system.

The system, e.g. processor, may be configured to determine the charge level of the rechargeable battery. The system, e.g. processor, may be configured to charge the rechargeable battery to a charge level of greater than 90%, such as between 90% and 100%, optionally between 90% and 95%, optionally between 95% and 100%, further optionally to 95% or greater.

The system, e.g. processor, may be configured to power the auxiliary unit(s) directly from the generator if the charge level of the battery is over 90%, optionally over 95%. In this instance, the system, e.g. processor, may be configured to decouple the rechargeable battery from the providing power to the auxiliary unit(s) until the generator is no longer able to provide sufficient power. Alternatively, the rechargeable battery and the generator may both provide power directly to the auxiliary unit(s) directly in parallel.

The system may comprise a switch to prevent power from the rechargeable battery being transferred to the auxiliary unit(s) in use. The system, e.g. processor, may be configured to control the switch depending on power supply arrangements. For example, if the system, e.g. processor, determines that the auxiliary unit(s), e.g. refrigeration unit, is to be powered by the rechargeable battery, then the switch may be closed to allow the electrical power to be transferred to the auxiliary unit(s) from the battery. Alternatively, if the system, e.g. processor, is configured to allow energy recovery from the generator and the rechargeable battery is at a charge level of over 90%, the switch may be opened so that power is not supplied to the auxiliary unit(s) from the battery. In this case electrical power may be provided to the auxiliary unit(s) directly from the generator.

The system, e.g. processor, may be configured to decouple the generator from the electrical supply to the rechargeable battery or auxiliary unit(s). In this instance, the generator may remain coupled to the axle and therefore may continue to be rotated by axle in use. However, there may be no significant rotational energy losses and/or less load imposed on the axel by the generator given that the generator is not being used to generate electricity in this instance.

Viewed from a third aspect, there is provided a vehicle comprising an energy recovery system, a generator for recovering energy during operation of the vehicle, a rechargeable battery coupled to the generator and a system for controlling the energy recovery from the generator as described in the second aspect above.

The vehicle may be a refrigeration transport unit, wherein the vehicle may comprise a drive portion and a refrigeration unit. The vehicle may be configured such that the refrigeration unit is powered by one, or other or both of the rechargeable battery or the generator directly.

The vehicle may comprise any of the features discussed in connection with both the first and second aspect of the present invention. The vehicle may be arranged to perform one or more or all of the steps of the above described method and/or may comprise one or more or all features of the system.

FIG. 1 shows a system 1 for controlling the recovery of energy from the rotational energy of an axle 5 of a vehicle. The vehicle comprises a wheel 3 which is driven by a drive system via the axle 5. The axle 5 is coupled to a generator 7 which can be configured to recover energy from the rotation of the axle. The generator 7 can achieve this by converting the mechanical energy from the rotating axel 5 to electrical energy for use in the vehicle.

The energy recovery system 1 comprises an accelerometer 10 for measuring the acceleration of the vehicle and an inclinometer 20 for measuring the inclination of a vehicle. The energy recovery system 1 further comprises a processor 30 which is configured to receive the measurements from the accelerometer 10 and the inclinometer 20. Based on these measurements, the processor 30 determines, using the algorithm depicted in FIG. 2, whether or not energy should be recovered using the generator 7.

Figure 2:
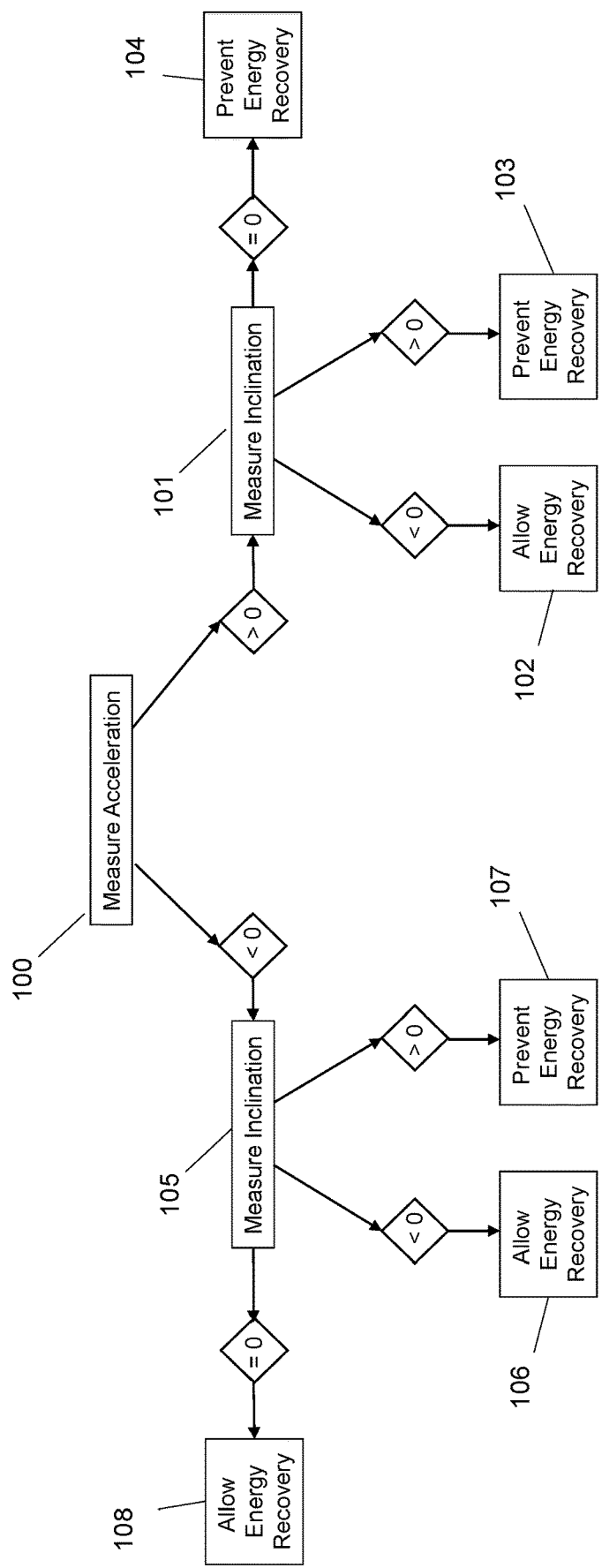
FIG. 2 shows a method for controlling the energy recovery from a vehicle used by the system shown in FIG. 1.

As shown in FIG. 2 the system is configured to measure 100 the acceleration of the vehicle using the accelerometer 10. When the acceleration of the vehicle is greater than zero, i.e. the vehicle is accelerating, the system determines 101 the inclination and based on this the processor can determine whether or not energy recovery from the generator 7 should occur.

If the measured inclination is less than zero, i.e. the vehicle is moving down a slope, the processor is configured to allow 102 energy recovery from the generator 7. In this instance, the vehicle may be accelerating due to it moving down a slope, not due to a driver request. As such the increased rotational energy produced by the axle is effectively "free" and should therefore be recovered.

If the measured inclination is greater than zero, i.e. the vehicle is accelerating up a slope due to the driver pressing the accelerator pedal, the processor is configured to prevent 103 energy recovery from the generator 7. This is due to the fact that the increase in speed is primarily due to an increase in energy output of the drive system of the vehicle (e.g. at the driver's request), and is therefore not "free". If the energy was recovered from the generator 7 in this instance, there may be a large load on the axle which could diminish its lifetime and/or could result in higher levels of fuel consumption.

If the inclination is equal to zero, or at least near zero within a predetermined tolerance of e.g. −5° and +5° from horizontal, the processor is configured to also prevent 104 energy recovery. As with the case where the inclination is greater than zero, in this instance the increase in speed is due to the driver request and so the energy is not "free".

Returning now the step 100 of measuring the acceleration. If the acceleration is less than zero, i.e. the vehicle is decelerating, the system is configured to determine 105 the inclination of the vehicle using the inclinometer 20. If the inclination is greater than zero, then the processor is configured to prevent 107 energy recovery from the generator. This scenario indicates that the vehicle is decelerating due to the increase in gradient, not due to a driver request, and therefore the energy is not "free". In this case, it is desirable for the load on the axle to be as low as possible.

If the inclination is less than zero, i.e. the vehicle is decelerating whilst travelling down a slope, this will be due to the driver pressing the brake pedal. In this case the processor is configured to allow 106 the generator 7 to recover energy.

Furthermore, if the inclination is equal to zero, or at least near zero within a predetermined tolerance, e.g. of −5° and +5° from the horizontal, the processor is configured to allow 108 energy recovery from the generator 7. This is due to the fact that the decrease in speed is due to the driver pressing the brake pedal and therefore the excess rotational energy is effectively "free".

Although not depicted in FIG. 1, the measured 100 acceleration may be zero if the vehicle is travelling at a constant speed. In this instance, the processor may determine whether or not energy recovery is suitable based on a variety of factors, including the inclination and power requirements of both the battery and the auxiliary unit(s).

For example, if the measured acceleration is zero and the inclination is greater than zero, this indicates that the vehicle is maintaining a constant speed up an incline due to the driver pressing the accelerator pedal. In this instance, the energy is not free and hence, the processor will prevent energy recovery. If the measured acceleration is zero and the inclination is less than zero, this indicates that the vehicle is maintaining a constant speed down an incline due to the driver pressing the brake pedal. In this instance, at least a part of the rotational energy is "free" and so the processor will allow energy recovery to take place.

Turning back to FIG. 1, the vehicle according to the present embodiment is a refrigeration transport unit and hence it comprises a refrigeration unit 9. Although the present invention is described herein in the context of a refrigeration transport unit with a refrigeration unit 9, this system is applicable to other types of vehicles and the unit 9 may be any auxiliary unit requiring electrical power.

The refrigeration unit 9 is powered by either a rechargeable battery 25 or directly from the generator 7, or by both where the power from the generator 7 is used to supplement power from the battery 25. The supply of power both to and from the battery 25 is determined by the position of a first switch 12 which is controlled by the processor 30. Meanwhile, the supply of power from the generator 7 to both the battery 25 and directly to the refrigeration unit 9 is controlled by a second switch 14, which is also controlled by the processor 30.

In operation, the processor can monitor the charge level of the rechargeable battery 25. The generator is typically used to charge the battery 25 up to a charge level of approximately 95%. Therefore, when the charge level of the battery is below 95%, the processor 30 closes the first switch 12 and second switch 14 so that power generated by the generator 7 is provided to the battery 25.

In cases where the charge level of the battery 25 is at or above 95%, the processor 30 opens the first switch 12. Similarly, if the processor determines that energy should not be recovered from the generator 7 in view of the measurements provided by the accelerometer 10 and the inclinometer 20, the processor may open the second switch 14. This removes the load on the generator 7 meaning that it rotates freely due to the rotation of the axle 6, but there is no load acting on it.

If the charge level of the battery 25 is at or above 95%, and the first switch 12 is therefore opened, the energy recovery from the generator 7 can be used to power the refrigeration unit 9 directly. The second switch 14 in this instance is therefore closed.

Alternatively, when the processor 30 is configured to prevent energy recovery from the generator 7 based on the measurements of the accelerometer 10 and the inclinometer 20, the refrigeration unit 9 is powered by the battery 25. In this instance the first switch 12 is closed and the second switch 14 is opened.

As a further alternative, both the first and second switch 12, 14 can be closed so that both the energy recovery from the generator 7 and the battery 25 are used to power the refrigeration unit simultaneously.

In certain cases, the processor 30 may determine that the rotational energy is not "free" based on the measured inclination or acceleration values. However, the processor 30 may also determine that the current charge level of the battery 25 is too low to continue powering the refrigeration unit 9. In this case, the processor 30 may be configured to allow energy recovery, despite the fact that it is not "free" in order to preserve the operation of the refrigeration unit 9.

The invention claimed is:

1. A method of controlling energy recovery from a vehicle, wherein the vehicle comprises a generator for recovering energy during operation of the vehicle; the method comprising:

measuring an inclination of the vehicle;
preventing the generator from recovering energy if the inclination of the vehicle is greater than zero and a charge level of a rechargeable battery coupled to the generator is above a threshold; and allowing the generator to recover energy regardless of the inclination when the charge level of the rechargeable battery is below the threshold.

2. The method of claim 1, further comprising measuring an acceleration of the vehicle.

3. The method of claim 2, comprising preventing the generator from recovering energy if the inclination is greater than zero and the acceleration is greater than zero.

4. The method of claim 2, comprising preventing the generator from recovering energy if the inclination is greater than zero and the acceleration is less than zero.

5. The method of claim 2, comprising allowing the generator to recover energy if the inclination is less than zero.

6. The method of claim 5, comprising allowing the generator to recover energy if the inclination is less than zero and the acceleration is greater than or less than zero.

7. The method of claim 2, comprising allowing the generator to recover energy if the inclination is at or near zero and the acceleration is less than zero, optionally wherein the acceleration is less than zero by more than a predetermined threshold.

8. The method of claim 1, further comprising:
determining whether rotational energy of the vehicle is free energy, wherein the free energy is rotational energy caused due to external forces acting on the vehicle; and
preventing the generator from recovering energy if the inclination of the vehicle is greater than zero and the rotational energy is not free energy,
wherein determining whether the rotational energy of the vehicle is free energy comprises comparing a measured acceleration of the vehicle with an expected acceleration based on the inclination of the vehicle.

9. The method of claim 1, wherein preventing the generator from recovering energy comprises decoupling the generator from an axle of the vehicle.

10. The method of claim 1, wherein the threshold for the charge level of the rechargeable battery is 30%.

11. The method of claim 1, further comprising powering one or more auxiliary units of the vehicle directly from the generator when the charge level of the rechargeable battery is above the threshold.

12. The method of claim 1, further comprising powering one or more auxiliary units of the vehicle from the generator and the rechargeable battery in parallel when the charge level of the rechargeable battery is above the threshold.

13. A system for controlling energy recovery from a generator of a vehicle, wherein the system comprises:
an inclinometer for measuring an inclination of the vehicle; and
a processor configured to:
determine the inclination of the vehicle using the measured inclination; and
prevent the generator from recovering energy if the inclination of the vehicle is greater than zero and a charge level of a rechargeable battery coupled to the generator is above a threshold; and
allow the generator to recover energy regardless of the inclination when the charge level of the rechargeable battery is below the threshold.

14. The system of claim 13, further comprising an accelerometer for measuring an acceleration of the vehicle, wherein the processor is further configured to determine the acceleration of the vehicle using the measured acceleration.

15. The system of claim 14, wherein the processor is configured to prevent the generator from recovering energy if the inclination is greater than zero and the acceleration is greater than or less than zero.

16. The system of claim 13, wherein the processor is configured to allow the generator to recover energy if the inclination is less than zero.

17. A vehicle comprising:
an energy recovery system;
a generator for recovering energy during operation of the vehicle;
a rechargeable battery; and
the system for controlling energy recovery from a generator of a vehicle of claim 9.

18. The vehicle of claim 17, wherein the vehicle comprises one or more auxiliary units.

19. The vehicle of claim 17, wherein the vehicle is configured so that the rechargeable battery is charged using the energy recovered using the generator; and/or
wherein the vehicle is configured so that one or more auxiliary units are powered directly using the energy recovered by the generator.

* * * * *